Patented June 5, 1934

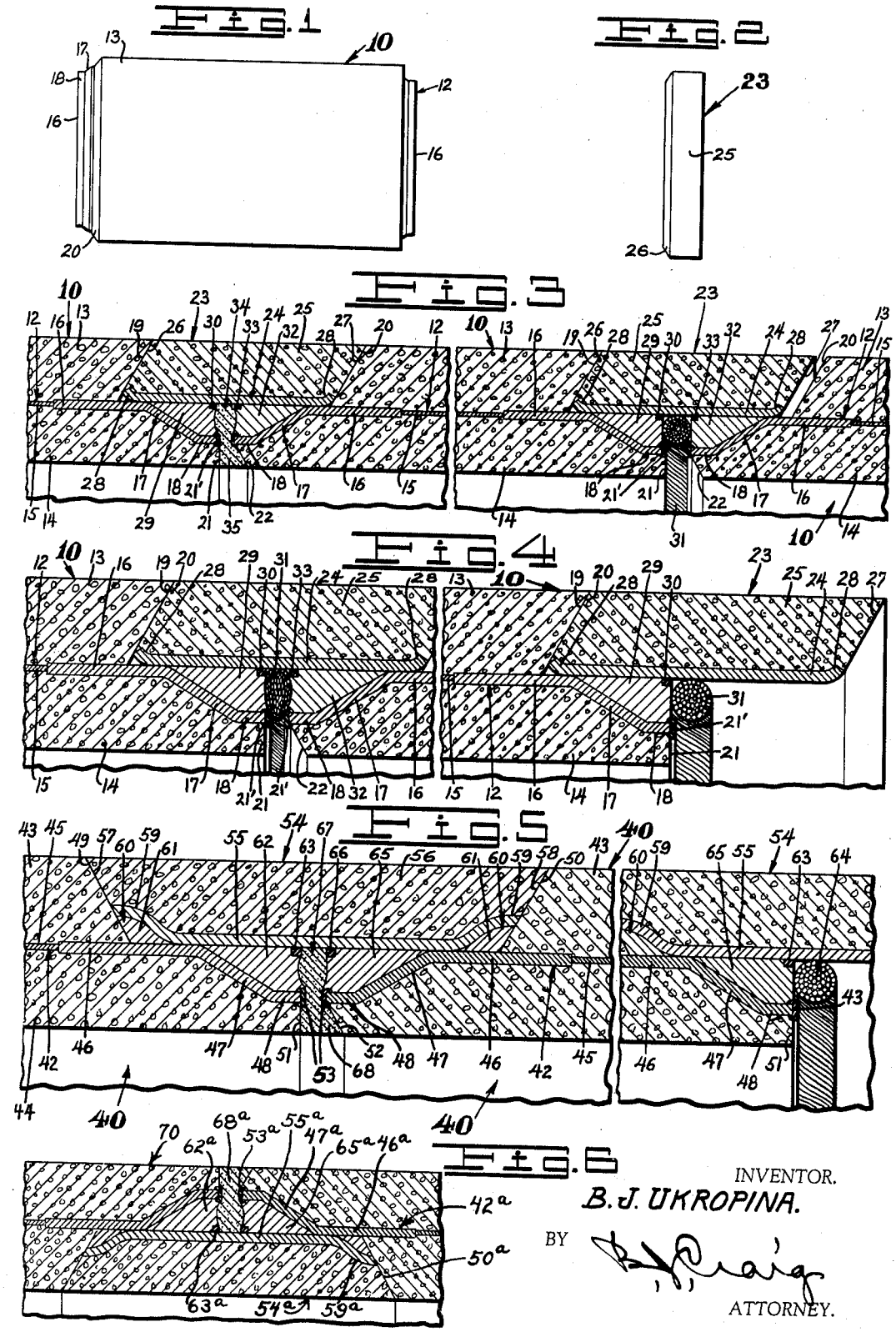

1,961,263

UNITED STATES PATENT OFFICE 1,961,263

CONCRETE PIPE CONSTRUCTION

Bozidar J. Ukropina, Los Angeles, Calif.

Application May 2, 1933, Serial No. 668,972

7 Claims. (Cl. 72—53)

This invention relates to improvements in concrete pipe construction.

The general object of the invention is to provide an improved concrete pipe.

Another object of the invention is to provide an improved leak-proof joint for concrete pipes.

Other objects and the advantages of the invention will be apparent from the following description taken in connection with the accompanying drawing wherein:

Fig. 1 is a side elevation of a length of concrete pipe embodying the features of my invention;

Fig. 2 is a side elevation of the collar member used in forming my improved joint;

Fig. 3 is an enlarged fragmentary section through a plurality of lengths of concrete pipe;

Fig. 4 is an enlarged fragmentary section through two lengths of pipe showing a joint before completion;

Fig. 5 is a fragmentary section through two lengths of pipe showing a modified form of joint and;

Fig. 6 is a fragmentary section of two lengths of pipe showing a modified form of joint.

Referring to the drawing by reference characters, I have indicated a length of concrete pipe embodying the features of my invention generally at 10. As shown the pipe 10 includes a metal reinforcing tube 12 embedded between the outer layer of concrete 13 and an inner layer of concrete 14. The reinforcing tube 12 comprises an intermediate portion 15 having enlarged metal end rings 16 butt welded thereto. Adjacent their outer ends the end rings 16 are beveled inward as at 17 and terminate in reduced end portion 18.

The outer layer of concrete 12 at each end of the pipe is set back from the outer end of the adjacent end ring 16 and is beveled as indicated at 19 and 20. The beveled portions 19 and 20 at opposite ends of the pipe both incline in the same direction. The base of the beveled portions 19 and 20 where they meet the end rings are positioned inwardly from the inclined portions 17 of the end rings.

The inner layer of concrete 14 at the end 19 of the pipe terminates flush with the outer end of the adjacent end ring 16 as indicated at 21 and the inner layer of concrete at the end 20 of the pipe also terminates flush with the outer end of the adjacent end ring and is beveled inwardly as indicated at 22. Fitted over the outer ends of the reduced portion 18 of the end rings I preferably provide a rubber gasket 22'.

In forming my improved joint between two lengths of the pipe 10 I use a collar member which is indicated generally at 23 and is shown in detail in Fig. 2. As shown the collar comprises a metal band 24 having a ring of concrete 25 cast thereon. The outer diameter of the collar 23 is substantially the same as the outer diameter of the pipe 10 and the inner diameter of the collar is approximately the same as the outer diameter of the end rings 16. The opposed end faces of the collar 23 are beveled as indicated at 26 and 27 at the same angle as the pipe ends 19 and 20 and both incline in the same direction. The ends of the band 24 are preferably flared outwardly as indicated at 28.

In use the collar 23 is positioned over the end ring 16 at the end 19 of the pipe with the beveled face 26 of the collar engaging the beveled face 19 of the pipe. A caulking material 29 such as lead wool is then driven in the space between the inner face of the collar band 24 and the outer surface of the reduced portion 18 and the beveled portion 17 of the end ring and extends from the outer end of the end ring inward. Adjacent the outer end of the caulking 29 and engaging the collar band 24 I preferably provide a rubber gasket 30 which is embedded in the caulking material. The collar 23 and the caulking material 29 are preferably assembled on a length of pipe at the place of manufacture.

After the caulking and gasket have been positioned in place a ring of hemp or other rope 31 is positioned in the collar and engages the caulking 29 and is secured to the collar band by a suitable adhesive material.

When joining two lengths of the pipe 10 a caulking material 32, such as lead wool, is positioned over the reduced portion 18 and the inclined portion 17 of the end ring 16 at the end 20 of the pipe. The outer diameter of the caulking material 32 corresponds approximately to the outer diameter of the end ring 16. The caulking material 32 may be built upon the end ring or it may be a preformed ring. Adjacent the outer end of the caulking 32 I preferably provide a rubber gasket 33 similar to the gasket 30.

After the caulking material 32 has been placed in position the end of the second pipe is inserted in the collar 23 on the first pipe and moved thereinto until the caulking 32 engages the rope 31 as shown to the right in Fig. 3. Thereafter, pressure is applied to the unengaged end of the second pipe and the second pipe moved toward the first pipe until the beveled face 20 of the second pipe engages the beveled face 27 of the collar on the first pipe. As the second pipe is thus moved the rope 31 is squeezed between the two caulkings 29 and 32 as shown at the left in Fig. 4. This action forces the caulking materials firmly into engagement with the collar band and the end rings of the pipes. The rope 31 is then pried or pulled out leaving a chamber 34 which is then filled with a plastic material 35 such as cement mortar as shown at the left in Fig. 3.

In Fig. 5 I have indicated a slightly modified form of concrete pipe generally at 40. As shown the pipe 40 includes a metal reinforcing tube 42 embedded between an outer layer of concrete 43 and an inner layer of concrete 44. The reinforcing tube 42 comprises an intermediate portion 45 having enlarged metal end rings 46 butt welded thereto. Adjacent their outer ends the end rings 46 are beveled as at 47 and terminate in reduced end portions 48. The outer layer of concrete 43 at each end is set back from the outer end of the adjacent end ring and is beveled as indicated at 49 and 50. The beveled portions 49 and 50 at opposite ends of the pipe incline from the end rings towards each other. The base of the beveled portions 49 and 50 where they meet the end rings are positioned inward from the inclined portions 47 of the end rings.

The inner layer of concrete 44 at the end 49 of the pipe terminates flush with the outer end of the adjacent end ring as indicated at 51 and the inner layer of concrete at the end 50 of the pipe also terminates flush with the outer end of the adjacent end ring and is beveled inward as indicated at 52. Fitted over the outer ends of the reduced portion 48 of the end rings I preferably provide a rubber gasket 53.

In forming a joint between two lengths of the pipe 40 I use a collar member indicated generally at 54. As shown the collar 54 comprises a metal band 55 having a ring of concrete 56 cast thereon. The outer diameter of the collar 54 corresponds to the outer diameter of the pipe 40 and the inner diameter of the collar is approximately the same as the outer diameter of the end rings 46. The opposed end faces of the collar 54 are beveled as indicated at 57 and 58 at the same angle as the pipe ends 49 and 50. The ends of the collar band 55 are flared outward as indicated at 59 to form annular recesses 60 in which a ring of caulking material 61 such as lead wool is positioned.

In use the collar 54 is positioned over the end ring 46 at the end 49 of the pipe with the beveled face 57 of the collar engaging the beveled face 49 of the pipe. A caulking material 62 such as lead wool is then driven in the space between the inner face of the collar band 55 and the outer surface of the reduced portion 48 and the beveled portion 47 of the end ring and extends from the outer end of the end ring inward. Adjacent the outer face of the caulking 62 and engaging the collar band 55 I preferably provide a rubber gasket 63 which is embedded in the caulking material. The collar 54 and the caulking 62 are preferably assembled on a length of pipe at the place of manufacture.

After the caulking 62 and the gasket 63 have been positioned in place a ring of hemp or other rope 64 is positioned in the collar and engages the caulking 62 and is secured to the collar band 55 by a suitable adhesive material.

When joining two lengths of the pipe 40 a caulking material 65, such as lead wool, is positioned over the reduced portion 48 and the incline portion 47 of the end ring 46 at the end 50 of the pipe. The outer diameter of the caulking 65 corresponds approximately to the outer diameter of the end ring 46 upon which it is positioned.

The caulking material 65 may be built upon the end ring or it may be a preformed ring. Adjacent the outer end of the caulking 65 I preferably provide a rubber gasket 66 similar to the gasket 63. After the caulking material 65 has been placed in position the end of the second pipe is inserted in the collar 54 of the first pipe and moved thereinto until the caulking 65 engages the rope 64. Pressure is then applied to the unengaged end of the second pipe and the second pipe moved towards the first pipe until the beveled face 50 of the second pipe engages the beveled face 58 of the collar 54 on the first pipe. As the second pipe is thus moved the rope 64 is squeezed between the two caulkings 62 and 65 which forces the caulking materials 62 and 65 firmly into engagement with the end rings and the collar band. The rope 64 is then pried out thereby leaving a chamber 67 which is then filled with a plastic material 68 such as cement motar.

In Fig. 6 I have indicated generally at 70 a variation of the device shown in Fig. 5. In some instances, it is desirable that the pipe be caulked from the outside and in this circumstance the joints shown in Fig. 6 would be employed. As shown the device 70 comprises two lengths of pipe having a reinforcing tube 42A therein and having metal ends 46A secured thereto. The inner layer of concrete is set back as at 50A. The ends of the member 46A are outwardly beveled as at 47A. A collar 54A similar in all respects to the collar 54 is arranged between two adjacent pipe lengths. This collar includes a band 55A which is tapered inwardly as at 59A.

The joint is constructed in the same manner as in connection with the device of Fig. 5 and the caulking 62A is employed together with gaskets 53A and 63A. After the joint is complete the chamber formed by the outer spaced lengths of pipe is filled with plastic material 68A.

In making the joint shown in Fig. 6, it will be understood that the rope 64 is employed in the same manner as previously described and that the joint is completed in the same fashion.

It will, also, be understood that the device shown in Figs. 3 and 4 may be varied so that the collar 23 is positioned in the outside of the pipe instead of the outside as shown in Fig. 6.

From the foregoing description it will be apparent that I have provided an improved concrete pipe and a novel pipe joint which is simple in construction and highly efficient in use.

Having thus described my invention, I claim:

1. A concrete pipe, said pipe including a metal reinforcing tube embedded between an outer layer of concrete and an inner layer of concrete, said reinforcing tube adjacent each end of said pipe being beveled inwardly, both ends of said outer layer of concrete being set back from the ends of said tube inwardly from said beveled portions of said tube and each being beveled, both the ends of the inner layer of concrete being flush with the ends of said tube.

2. The combination of two lengths of concrete pipe adapted to be laid end to end, each of said pipes including a reduced portion at each end thereof, and each reduced portion including a further reduced end portion, a collar member, said collar being positioned over said first reduced portion at one end of one of said pipes with one end face of said collar engaging the adjacent end face of said pipe and with a portion of said collar projecting beyond the end of said pipe and a caulking material positioned in the space between said collar and said further reduced portion of the associated pipe.

3. The combination of two lengths of concrete pipe adapted to be laid end to end, each of said pipes including a reduced portion at each end thereof, and each reduced portion including a further reduced end portion, a collar member, said collar being positioned over said first reduced portion at one end of one of said pipes with one end face of said collar engaging the adjacent end face of said pipe and with a portion of said collar projecting beyond the end of said pipe, a caulking material positioned in the space between said collar and said further reduced portion of the associated pipe, a ring of fibrous material positioned in said collar and engaging said caulking, a caulking material positioned on one of said further reduced portions of said second pipe, said caulked end of said second pipe then being positioned in said collar with the caulking thereon engaging said fibrous ring.

4. A concrete pipe, said pipe including a metal reinforcing tube embedded between an outer layer of concrete and an inner layer of concrete, said tube adjacent the ends of said pipe being beveled inwardly and terminating in a plane reduced end portion, the ends of said outer layer of concrete being set back from the ends of said tube inwardly from said beveled portions of said tube and being beveled, the ends of the inner layer of concrete being flush with the ends of said tube, a collar member, said collar comprising a metal band having a ring of concrete thereon, the outer diameter of said collar corresponding to the outer diameter of said pipe, the inner diameter of said collar corresponding approximately to the outer diameter of said tube, the end faces of said collar being beveled to match the bevel of said pipe ends, said collar being positioned over said tube at one end of said pipe with one face of said collar engaging the adjacent end of said pipe and with a portion of said collar protruding beyond said pipe and a caulking material positioned in the space between said tube and said collar.

5. The combination of two lengths of concrete pipe adapted to be laid end to end, each of said pipes including a metal reinforcing tube embedded between an outer layer of concrete and an inner layer of concrete, said tube adjacent the ends being beveled inwardly, the ends of said outer layer of concrete being set back from the ends of said tube inward from said beveled portions of said tube and being beveled, a collar member, said collar comprising a metal band having a ring of concrete thereon, the inner diameter of said collar corresponding approximately to the outer diameter of said tubes, said collar being first positioned over said tube at one end of one of said pipes with one face of said collar engaging the adjacent end of said pipe and with a portion of said collar protruding beyond the end of said pipe, a caulking material positioned in the space between said tube and said collar, and a ring of rope positioned in and secured to said collar and engaging said caulking.

6. The combination of two lengths of concrete pipe adapted to be laid end to end, each of said pipes including a metal reinforcing tube embedded between an outer layer of concrete and an inner layer of concrete, said tube adjacent the ends being beveled inwardly, the ends of said outer layer of concrete being set back from the ends of said tube inward from said beveled portions of said tube and being beveled, the ends of said inner layer of concrete being flush with the ends of said tube, a collar member, said collar comprising a metal band having a ring of concrete thereon, the outer diameter of said collar corresponding to the outer diameter of said pipes and the inner diameter of said collar corresponding approximately to the outer diameter of said tubes, the end faces of said collar being beveled to match the bevel of said pipe ends, said collar being first positioned over said tube at one end of one of said pipes with one face of said collar engaging the adjacent end of said pipe and with a portion of said collar protruding beyond the end of said pipe, a caulking material positioned in the space between said tube and said collar, a ring of rope positioned in and secured to said collar and engaging said caulking, a caulking material on said reduced and beveled portion of one end of said other pipe, said caulking end of said second pipe being positioned in said collar with said second caulking engaging said rope.

7. The combination of two lengths of concrete pipe adapted to be laid end to end, each of said pipes including a metal reinforcing tube embedded between an outer layer of concrete and an inner layer of concrete, said tube at each end projecting beyond the ends of said outer layer of concrete, said tube adjacent each end including a reduced portion, the ends of said outer layer of concrete being beveled with the base of said bevel positioned inward from said reduced portion of said tube, a collar member, said collar member including a metal tube having a layer of concrete thereon, the inner diameter of said collar corresponding approximately to the outer diameter of said pipe tube, the end faces of said collar being beveled to match said bevel of said pipe ends, the ends of said collar band being flared outwardly to form an annular recess in each end face of said collar, a caulking material positioned in each of said collar recesses, said collar being first positioned over said tube at one end of one of said pipes with one face of said collar engaging the adjacent beveled end face of said pipe and with a portion of said collar projecting beyond the end of said pipe, a caulking material positioned in the space between said collar and said reduced portion of said pipe tube, a caulking material positioned on said reduced portion of said tube of said second pipe, said caulking materials being spaced to form a chamber and a filling of plastic material in said chamber.

BOZIDAR J. UKROPINA.